May 22, 1945. W. W. MOWER ET AL 2,376,803
COUPLING DEVICE
Filed June 19, 1944 2 Sheets-Sheet 1

INVENTORS.
WILLIAM W. MOWER.
WILLIAM F. VAN LOENEN.
BY James E. Toomey
Agt.

INVENTORS.
WILLIAM W. MOWER.
WILLIAM F. VAN LOENEN.
BY

Patented May 22, 1945

2,376,803

UNITED STATES PATENT OFFICE 2,376,803

COUPLING DEVICE

William W. Mower and William F. Van Loenen, Los Altos, Calif., assignors to The Permanente Metals Corporation, Oakland, Calif., a corporation of Delaware Application June 19, 1944, Serial No. 541,060

10 Claims. (Cl. 284—4)

This invention relates to coupling devices for pipes and the like, particularly of the type useful in systems where it is desired to keep the material to be conveyed from contact with the air or atmosphere, or to prevent it from spilling or the like.

It is an object of our invention to provide a coupling device in which the valve closure members abut each other so that none of the material remaining in the coupling is spilled or exposed to the atmosphere when the conveying line is opened. It is another object of our invention to provide a coupling device which, when the valves are opened, affords uninterrupted and unimpeded passage to materials flowing thru its channels, particularly where these materials are finely divided solids conveyed by means of a carrier gas.

The coupling device of this invention comprises a valve structure having a minimum of elements to which motion is imparted, and having passages which permit unobstructed flow of materials thru the device. The latter is particularly advantageous in conveying solids, such as powdered materials. In the coupling device of this invention, the valve closure members are adjacent each other, preventing loss or exposure to the atmosphere of material upon separation of the valve members when the valves are in the closed position.

Our coupling device comprises two separable housings, or coupling members, containing valve closure members having curvilinear surfaces and rotatable in the housings, the valve closure members having transverse channels therethru, the housings containing also suitable inlet and outlet means. Each cylindrical element has a recess adapted to receive a segment of the surface of the adjacent cylindrical element. The valve closure members are disposed within the housing members in suitable curvilinear recesses therein.

In one preferred embodiment of our invention, the coupling device comprises two housing members which abut along one face, each housing member having an aperture in the rearward wall, that is, the wall in each section farthest from the abutting face, adapted to receive a material-conducting conduit or pipe, each section having a cylindrical recess into which is fitted a cylinder perpendicular to the axis of the aperture and rotatable within the housing and within which cylinder is a transverse channel which is registrable with the aperture, or with which the aperture communicates when the valve is in the open position. The surface of one cylinder is recessed longitudinally in the region of one end of the channel to accommodate a segment of the second cylinder, and the second cylinder is simlarly recessed in the area between the channel ends to accommodate a segment of the first cylinder. Each housing member also has an aperture in the forward wall thereof and the recess in the enclosed valve closure member is brought into register with this forward aperture when desired. The cylinders are turned to the open or closed position by means of an extension which projects beyond the outer surface of the housing.

This embodiment of our invention is more clearly described below with reference to the accompanying drawings in which.

Figure 1:
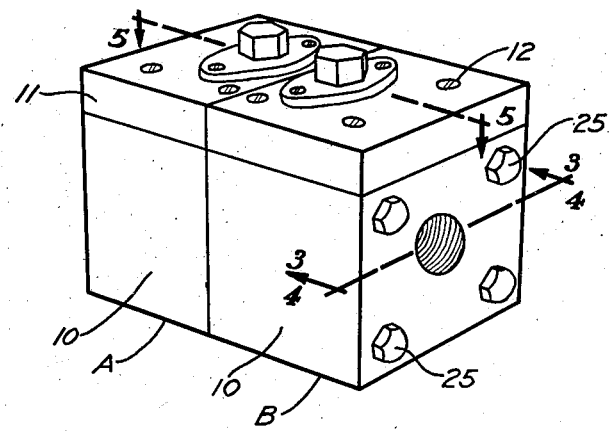
Figure 1 is a perspective view of the assembled coupling device showing one aperture, which may be an inlet or outlet, as desired.
Figure 2:
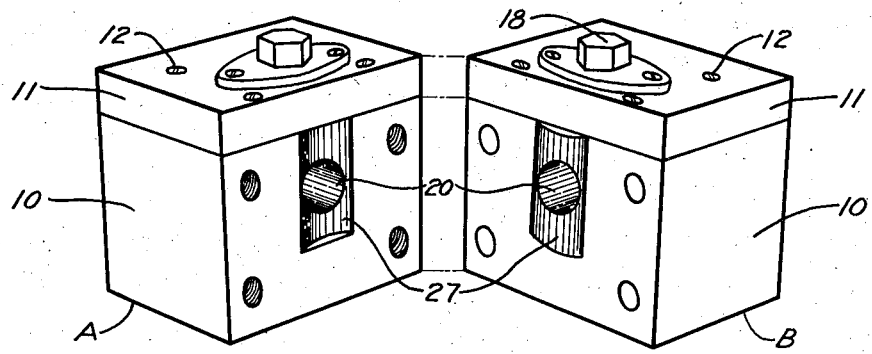
Figure 2 is a perspective view of the separated sections of the device, showing the valve members at the open position.

In the drawings, 10 and 10 are the bases of housing elements of the coupling, 11, 11 are the heads of the housing elements which are secured to the bases by bolts 12 when the coupling is assembled. Apertures 13 in the rearward walls of the bases 10 are shown in this embodiment as threaded, and are adapted to receive pipes or connections of other conveying means for the material to be handled, not shown. Cylinders 14 and 15, are received within recesses or spaces 16 in bases 10, extensions 17 projecting above housing heads 11 and being suitably finished at 18 in polyhedral shape to provide means whereby the valve member may be grasped and rotated, as with a wrench. The cylinders are supported within the bases 10 on projections 26 which are seated in cylindrical recesses 19 in the bases and provide therewith the bearing surfaces in turning the valve closure members, or cylinders. Apertures 27, 27 in the abutting faces of housing members 10, 10 are closed off by the respective cylinders when the valve members are in the closed position and these apertures register with the longitudinal recesses 21 and 22 in the surfaces of the valve members as will be described more fully below. Each cylinder, therefore, projects slightly beyond the abutting face of the housing except when the longitudinal recess is presented at that face.

Channels 20 extend thru the cylinders perpendicular to their axes and, when the valves are in the open position, are axially aligned with apertures 13 and with each other, providing a continuous passage for unobstructed flow of material thru the coupling device.

Figures 3, 4:
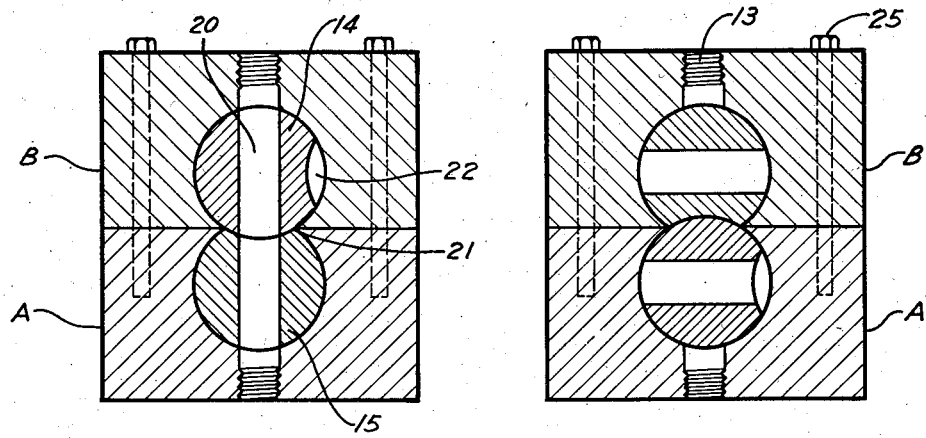
Figure 3 is a sectional view of the assembled coupling device along the line 3—3 of Figure 1, showing the valves in the open position.
Figure 4 is the same view, but showing the valves in the closed position.
Figure 5:
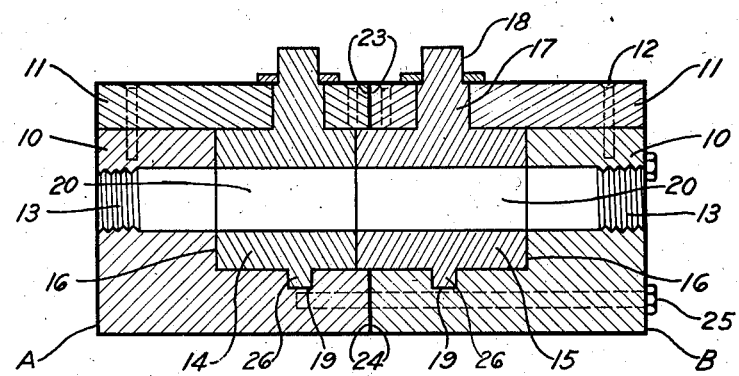
Figure 5 is a sectional view of the assembled coupling longitudinally along the diameters of the cylinders, showing the valves in the open position.

As shown in Figures 3 and 4, cylinder 15 has a recess 21 longitudinally of its face which receives in abutting relationship a segment of the surface of cylinder 14 at the inner end of channel 20. Cylinder 14 has a similar recess 22, which is located in the area on the surface of the cylinder between the ends of channel 20 thereof and, as shown in this figure, is conveniently located about midway of the surface between the channel endings, or, at about 90° from each such end. Recess 22, when the valve members are moved to the closed position, as shown in Figure 4, receives a segment of the surface of cylinder 15 in abutting relationship; and in this figure it can be seen that the channels and the longitudinal recess 21, with any material contained therein, are completely closed off from contact with the atmosphere when in this position. The abutting faces 23 and 24 of head members 11 and base members 10, respectively, are close fitting and, suitably, are ground so that their juncture is tight, preventing access of air or atmosphere, and leakage of material. Likewise, the cylinders and the receiving spaces therefor in the base members are also ground to fit, insuring tight joints. If desired, suitable limits of rotation of the cylindrical members may be indicated by lugs or other devices or insignia located, for example on the housing heads.

In assembling the coupling device shown in the figures the cylindrical valve closure member is placed in the base so that projection 26 seats into space 19. The cylinder 14, or 15, fits within space 16 of the base. The head 11 is now placed on the base and fastened in position, the extension 18 projecting above the head so that it may be grasped in order to adjust the position of the valve closure member. When the complementary section of the coupling device has been similarly assembled, one cylinder is adjusted so as to present its recessed portion at the plane of separation of the device. The sections are then joined and fastened together. In order to assure tight joints, adjacent surfaces are suitably ground to fit.

The device operates in the following manner. A pipe, tube or other conveying device is screwed into, otherwise attached to, an inlet aperture 13, leading, let us say for example, to cylinder 14. Another tube, pipe or the like is similarly attached to the aperture 13 leading to cylinder 15. The coupling sections A and B are joined at faces 23 and secured by means of bolts 25. Cylinders 14 and 15 are turned to the open position, shown in Figure 6, by means of extensions 18. Flow of material is started. When it is desired to uncouple the conveying pipes or tubes, the flow of material is stopped and cylinder 14 is turned thru an angle of about 90° to approximately the position shown in Figure 4; and cylinder 15 is then turned thru an angle of approximately 90° also. As shown in Figure 4, the channels of both cylinders and the recess of cylinder 15 are now entirely sealed off by the walls of the base. In this manner there is no loss of material by leakage nor is the material exposed to the atmosphere.

This device is particularly useful in systems for conveying pyrophoric materials. For example, a pyrophoric powder can be conveyed thru this coupling by an inert carrier gas in uninterrupted passage and, when the flow is stopped and the coupling is separated as described above, the powder remaining in the device is not exposed to the atmosphere and the danger of combustion upon contact with air or other gaseous medium is avoided. The device is also useful in joining a line such as the lines for hydraulic brake systems connecting a truck with a trailer. The truck and trailer can be separated and rejoined, or another vehicle substituted for either, without loss of fluid or admission of air to the hydraulic fluid line.

In another suitable embodiment of the apparatus of our invention, each separable housing member contains a recess which is spherical in shape and also contains an aperture in the rearward wall adapted to receive a material-conducting conduit or pipe and an aperture in the forward wall. The valve closure members are also spherical in shape and have transverse channels for conducting material therethru. One of the valve closure members has an indentation, or recess, in its surface at the end of its transverse channel which is adapted to receive a segment of the surface of the second valve closure member and which also is registrable, or can be brought into register, with the aforementioned aperture in the forward wall of the housing member within which the valve closure member is disposed. The second valve closure member has an indentation, or recess, in its surface between the ends of its transverse channel which is adapted to receive a segment of the surface of the first valve closure member and which also can be brought into register, or is registrable, with the forward aperture in the second housing member within which the second valve closure member is disposed. In each housing member, the aperture in the rearward wall is registrable with the transverse channel in the valve closure member disposed within the housing member. The forward wall of the housing member may be of any suitable dimension and may be of considerable cross-sectional area in the case of a block member, as shown in the accompanying drawings. In the case of the spherical valve closure member, the housing may be of substantially hemispherical shape, thus making possible a somewhat lighter weight construction, and the forward wall would then be of smaller cross-sectional dimension. The forward walls abut when the apparatus is assembled and prevent ingress of air or undesired gas or other material and also prevent loss of material being handled by the coupling device. When the valve closure members are spherical in form, each housing member is suitably divided into separable sections, or base and head, about midway of the diameter of the spherical recess therein to enable proper assembling of the device. An extension is provided for each valve member by which it may be grasped and adjusted to position.

It is to be understood that the above description and drawings have been given for purposes of illustration only and that various changes and modifications may be made in the details of this invention without departing from the broader spirit and scope of the appended claims.

Having now described our invention, what we wish to claim is:

1. A coupling device comprising two separable housing members, each housing member containing a curvilinear recess having therein a rotatable valve closure member, each of said valve closure members having a transverse channel therethru, one of said valve closure members having at the end of its said channel a recess adapted to receive a segment of the surface of the second valve closure member, the second valve closure member having between the ends of its said channel a recess adapted to receive a segment of the surface of the first valve closure member, said housing members each having an aperture in the rearward wall thereof registrable with the said transverse channel of the valve closure member disposed therein.

2. A coupling device comprising two separable housing members, each housing member containing a curvilinear recess, two rotatable valve closure members having curvilinear surfaces and each adapted to be received by one of said recesses, each of said valve closure members having a transverse channel therethru, one of said valve closure members having at the end of its said channel an indentation adapted to receive a segment of the surface of the second valve closure member, the second valve closure member having between the ends of its said channel an indentation in its said curvilinear surface adapted to receive a segment of the surface of the first valve closure member, said housing members each having an aperture in the rearward wall thereof registrable with each of said transverse channels, and means whereby each said valve closure member is rotated.

3. An apparatus for handling materials out of contact with air which is a coupling device comprising two separable housing members, each housing member having a curvilinear recess therein and having an aperture in the reward wall thereof and an aperture in the forward wall thereof, a rotatable valve closure member having a curvilinear surface disposed within each of said curvilinear recesses, each said valve closure member having a transverse channel therethru, one of said valve closure members having at the end of its said channel an indentation adapted to receive a segment of the surface of the second valve closure member and registrable with the said forward aperture in the first housing member, the second valve closure member having in its surface between the ends of its said channel an indentation adapted to receive a segment of the surface of the first valve closure member and being registrable with the forward aperture in the second housing member, the said rearward aperture in each housing member being registrable with the transverse channel of the said valve closure member disposed therein, and means whereby each said valve member is rotated.

4. A coupling device comprising two separable housing members, each housing member containing a cylindrical recess having therein a cylindrical valve closure member, each of said valve closure members having a transverse channel therethru, one of said valve closure members having at the end of its said channel a longitudinal recess adapted to receive a segment of the second valve closure member, the second valve closure member having a longitudinal recess between the ends of its said channel adapted to receive a segment of the first valve closure member, said housing members each having an aperture in the rearward wall thereof registrable with said transverse channels.

5. A coupling device comprising two separable housing members, each housing member containing a cylindrical recess having therein a cylindrical valve closure member, each of said valve closure members having a transverse channel therethru, one of said valve closure members having at the end of its channel a longitudinal recess adapted to receive a segment of the second valve closure member, the second valve closure member having a longitudinal recess between the ends of its said channel adapted to receive a segment of the first valve closure member, and means whereby each of said valve closure members is rotated, said housing members each having an aperture in the rearward wall thereof registrable with said transverse channel.

6. An apparatus for handling materials out of contact with air which is a coupling device comprising two separable housing members, each housing member containing a cylindrical recess having therein a cylindrical valve closure member, each of said valve closure members having a transverse channel therethru, one of said valve closure members having at the end of its said channel a longitudinal recess adapted to receive a segment of the second valve closure member, the second valve closure member having a longitudinal recess between the ends of its said channel adapted to receive a segment of the first valve closure member, said housing members each having an aperture in the rearward wall thereof registrable with said transverse channel.

7. An apparatus for handling materials out of contact with air which is a coupling device comprising two separable housing members, each housing member having a cylindrical recess therein, a cylindrical valve closure member disposed within said cylindrical recess in each housing member, each of said valve closure members having a transverse channel therethru, one of said valve closure members having at the end of its said channel a longitudinal recess adapted to receive a segment of the second valve closure member, the second valve closure member having a longitudinal recess between the ends of its said channel adapted to receive a segment of the first valve closure member, said housing members each having an aperture in the rearward wall thereof, said channels and said apertures being axially aligned when said valve closure members are in the open position.

8. An apparatus for handling materials out of contact with air which is a coupling device comprising two separable housing members, each housing member having cylindrical recess therein, a cylindrical valve closure member disposed within said cylindrical recess in each housing member, each of said valve closure members having a transverse channel therethru, one of said valve closure members having at the end of its said channel a longitudinal recess adapted to receive a segment of the second valve closure member, the second valve closure member having a longitudinal recess between the ends of its said channel adapted to receive a segment of the first valve closure member, means whereby each of said valve closure members is rotated, said housing members each having an aperture in the rearward wall thereof, said channels and said apertures being axially aligned when said valve closure members are in the open position.

9. An apparatus for handling materials out of contact with air which is a coupling device comprising two separable housing members, each housing member having a cylindrical recess therein and having an aperture in the rearward wall thereof and a rectangular aperture in the forward wall thereof, a cylindrical valve closure member disposed within said cylindrical recess in each housing member, each said valve closure member having a transverse channel therethru, one of said valve closure members having at the end of its said channel a longitudinal recess adapted to receive a segment of the second valve closure member and being registrable with said rectangular aperture in said forward wall of its said housing member, the second valve closure member having a longitudinal recess between the ends of its said channel adapted to receive a segment of the first valve closure member and being registrable with said rectangular aperture in said forward wall of its said housing member, the said rearward aperture in each said housing member being registrable with the transverse channel of the said valve closure member disposed therein, and means whereby each valve closure member is rotated.

10. An apparatus for handling materials out of contact with air which is a coupling device comprising two separable housing members, each housing member having a cylindrical recess therein and having an aperture in the rearward wall thereof and an aperture in the forward wall thereof, a cylindrical valve closure member disposed within each said cylindrical recess, each said valve member having a transverse channel therethru, one of said valve closure members having at the end of its said channel a longitudinal recess adapted to receive a segment of the surface of the second valve closure member and being registrable with the said forward aperture in the first housing member, the second valve closure member having in its surface between the ends of its said channel a longitudinal recess adapted to receive a segment of the surface of the first valve closure member and being registrable with the said forward aperture in the second housing member, the said forward walls of the first and second housing members being in abutting relationship when the said apparatus is assembled, the said rearward aperture in each housing member being registrable with the transverse channel of the valve closure member disposed therein, and means whereby each said valve closure member is rotated.

WILLIAM W. MOWER.
WILLIAM F. VAN LOENEN.